United States Patent
Sabet et al.

(10) Patent No.: US 10,855,730 B2
(45) Date of Patent: Dec. 1, 2020

(54) CLEAN VIDEO SWITCH AMONG MULTIPLE VIDEO FEEDS IN A SECURITY SYSTEM

(71) Applicant: Crestron Electronics, Inc., Rockleigh, NJ (US)

(72) Inventors: Sameh Sabet, Rockleigh, NJ (US); Richard Seroka, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/798,570

(22) Filed: Oct. 31, 2017

(65) Prior Publication Data

US 2019/0132366 A1    May 2, 2019

(51) Int. Cl.
*H04L 29/06* (2006.01)
*H04L 29/08* (2006.01)

(52) U.S. Cl.
CPC ...... *H04L 65/1083* (2013.01); *H04L 65/1069* (2013.01); *H04L 65/4069* (2013.01); *H04L 69/14* (2013.01); *H04L 67/02* (2013.01)

(58) Field of Classification Search
CPC ... H04Q 3/005; H04Q 3/0029; H04M 3/4228; H04M 3/42297; G06F 12/0292; G06F 16/951; G06F 16/93; G06F 16/9535; G06F 16/24522; G06F 16/25; G06F 16/283; G06F 19/321
See application file for complete search history.

(56) References Cited

U.S. PATENT DOCUMENTS

| | | | |
|---|---|---|---|
| 4,038,686 A | 7/1977 | Baker | |
| 6,239,842 B1 | 5/2001 | Segman | |
| 6,771,243 B2 | 8/2004 | Hirohata | |
| 7,423,624 B2 | 9/2008 | Nose | |
| 7,477,285 B1 * | 1/2009 | Johnson | G08B 13/19602 348/143 |
| 8,525,763 B2 | 9/2013 | Umezaki et al. | |
| 8,952,879 B2 | 2/2015 | Kimura | |
| 9,129,400 B1 * | 9/2015 | Ivanchenko | G06T 7/248 |

(Continued)

*Primary Examiner* — Ninos Donabed
(74) *Attorney, Agent, or Firm* — Crestron Electronics, Inc.

(57) ABSTRACT

A system and method for using both video and periodically refreshed images in a video surveillance system is described herein the method comprising receiving a first request from a first device at a first camera for a first video stream generated by the first camera to be transmitted using a first communication path; beginning the process of establishing the first communications path from the first camera to the first device; establishing second communications path from the first camera to the first device while the first communications path is being established, wherein the second communications path can be used to transmit a plurality of periodically refreshed images while the first communications path is being established; transmitting the plurality of periodically refreshed images from the first camera to the first device using the second communications path while the first communications path is being established; and transmitting the first video stream from the first camera to the first device using the first communications path once it has been established, and then shutting down the transmission of the plurality of periodically refreshed images using the second communications path.

10 Claims, 5 Drawing Sheets

(56) References Cited

U.S. PATENT DOCUMENTS

| | | | |
|---|---|---|---|
| 9,143,670 B1* | 9/2015 | Cilia | H04N 5/23245 |
| 2003/0037341 A1* | 2/2003 | Van Der Meulen | G08C 17/02 |
| | | | 725/143 |
| 2003/0169278 A1* | 9/2003 | Obrador | H04N 5/23245 |
| | | | 345/629 |
| 2006/0007359 A1 | 1/2006 | Douangphachanh | |
| 2006/0123445 A1* | 6/2006 | Sullivan | H04N 19/427 |
| | | | 725/38 |
| 2011/0122271 A1* | 5/2011 | Nobuoka | H04N 5/343 |
| | | | 348/220.1 |
| 2012/0245978 A1* | 9/2012 | Jain | G06Q 30/02 |
| | | | 705/7.34 |
| 2013/0141525 A1* | 6/2013 | Williams | G06T 7/00 |
| | | | 348/38 |
| 2014/0055613 A1* | 2/2014 | Ohtomo | H04N 5/23203 |
| | | | 348/144 |
| 2015/0178597 A1* | 6/2015 | Kim | G06K 9/00624 |
| | | | 382/103 |
| 2015/0208032 A1* | 7/2015 | Gavney, Jr. | H04N 21/4223 |
| | | | 348/14.08 |
| 2015/0221209 A1* | 8/2015 | Janardhanan | G08B 13/1968 |
| | | | 340/541 |
| 2015/0243067 A1* | 8/2015 | Ishikawa | G02B 27/017 |
| | | | 345/473 |
| 2017/0064206 A1* | 3/2017 | Ku | H04N 5/2258 |
| 2017/0289462 A1* | 10/2017 | Eum | H04N 5/2628 |

* cited by examiner

CLEAN VIDEO SWITCH AMONG MULTIPLE VIDEO FEEDS IN A SECURITY SYSTEM

BACKGROUND OF THE INVENTION

Technical Field

The embodiments described herein relate generally to video display systems, and more specifically to systems, methods, and modes for displaying still images in a general purpose control system in place of video until such video is ready to be displayed.

Background Art

FIG. 1 illustrates a block diagram of a currently available multiple input-multiple output (MIMO) video display system (MIMO-VDS) 100, configured in the form factor of a surveillance system that comprises about twelve different cameras 102a-l, each of which provides a live video feed to central processing station (CPS) 108.

In MIMO-VDS 100, a plurality of video feeds, from cameras 102a-l (typically digital cameras, but not necessarily), provide video to CPS 108 via wireless (WL) transceiver links 104, or physical links (typically cables) 106. The received video signals are processed by VDS processor, memory, program/application (APP), and other internal circuitry (VDS circuitry) 120, all of which are known to those of skill in the art, and displayed on video display 112, as shown in FIG. 1. Video display 112 can generally be divided into many different video display areas, but in this case, twelve, as FIG. 1 illustrates. The 12 separate display areas each correspond to respective video feed/cameras 102a-l. MIMO-VDS 100 further includes VDS interface 110 that allows one or more users to control any and all aspects of MIMO-VDS 100. MIMO-VDS 100 can also be operated remotely, via a local area network (LAN), wide area network (WAN), personal area network (PAN), or global area network (GAN), such as the internet.

The locally or remotely located operator(s) can watch each of the videos in first video display areas 114a-1, and if desired, click on one to create a larger display area, such as second display area 116. In this case, the operator(s) can then have a larger viewing area of the camera feed that was selected, so that the one or more users or operators can see with greater detail the selected area. In the case of MIMO-VDS 100 such re-display of the selected video feed occurs practically instantaneously, as MIMO-VDS 100 is designed to receive and display the various video feeds as that is its primary purpose. Then, the remaining video displays are segregated into separate third video display areas 118a-l. Other configurations of the video display areas are possible as well, and the above provided description is provided as a brief overview only.

Currently available MIMO-VDSs 100 can also be internet-protocol (IP) based. Currently available IP-based video surveillance equipment (e.g. cameras 102) provide high definition (HD)/high bandwidth video feeds to client devices such as cellular telephones, or personal digital assistants (PDAs) (devices) for monitoring and viewing. However, many of these portable, personal devices do not have the bandwidth or processing power to easily lock onto and display these HD video streams instantaneously. Moreover, protocols used to setup such streams introduce latencies and delays in switching to these video feeds, especially when dealing with a multitude of varying vendors, such as those that provide/manufacture cameras 102, and CPS 108, among other devices. These delays result in a less than optimum user experience resulting from seconds of delayed video, black screens during video switching to different sources and an overall lagging behavior.

Accordingly, a need has arisen for systems, methods, and modes for displaying still images in place of video in a general purpose control system until such video is ready to be displayed.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for displaying still images in place of video in a general purpose control system until such video is ready to be displayed that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a method for using both video and periodically refreshed images in a video surveillance system, comprising: receiving a first request from a first device at a first camera for a first video stream generated by the first camera to be transmitted using a first communication path; beginning the process of establishing the first communications path from the first camera to the first device; establishing second communications path from the first camera to the first device while the first communications path is being established, wherein the second communications path can be used to transmit a plurality of periodically refreshed images while the first communications path is being established; transmitting the plurality of periodically refreshed images from the first camera to the first device using the second communications path while the first communications path is being established; and transmitting the first video stream from the first camera to the first device using the first communications path once it has been established, and then shutting down the transmission of the plurality of periodically refreshed images using the second communications path.

According to the first aspect of the embodiments, the method further comprises a network switch adapted to receive the first request from the first device, and transmit the same to the first camera, establish both the first and second communication paths between the first camera and the first device through the network switch, shut down the second communications path once the first communications path is established, and is further adapted to receive both of the transmitted plurality of periodically refreshed images and first video stream from the first camera and transmit both of the same to the first device.

According to the first aspect of the embodiments, the method further comprises transmitting a second request by the network switch to the first camera to generate and transmit a plurality of periodically refreshed images using a second communications path.

According to the first aspect of the embodiments, both the first and second communications path are the same physical high bandwidth internet protocol based communications path capable of transmitting video signals.

According to the first aspect of the embodiments, the first and second communications path are different physical internet protocol based communications paths.

According to the first aspect of the embodiments, the video surveillance system is part of an enterprise management system.

According to the first aspect of the embodiments, the first device can be any type of electronic device capable of wireless or wired communications.

According to a second aspect of the embodiments, an enterprise management system (system) is provided that includes a video surveillance function feature, comprising, among other components: a first camera adapted to generate both video and periodically refreshed images, and to respond to requests for the same; a first device adapted to receive and display both video and periodically refreshed images, and to generate a first request to the first camera for a first video stream generated by the first camera to be transmitted using a first communication path; the enterprise management system adapted to generate commands to establish the first communications path from the first camera to the first device, and to generate commands to establish a second communications path from the first camera to the first device while the first communications path is being established, and wherein the second communications path can be used to transmit a plurality of periodically refreshed images while the first communications path is being established.

According to the second aspect of the embodiments, the system further comprises a network switch adapted to receive the first request from the first device and transmit the first request to the first camera for the first video stream, receive both video and periodically refreshed images from the first camera, and transmit both video and periodically refreshed images to the first device, generate commands to establish the first and second communications paths, and generate commands to terminate the second communications path once the first communications path is established and transmitted the first video stream.

According to the second aspect of the embodiments, both the first and second communications path are the same physical high bandwidth internet protocol based communications path capable of transmitting video signals.

According to the second aspect of the embodiments, the first and second communications path are different physical internet protocol based communications paths.

According to the second aspect of the embodiments, the first device can be any type of electronic device capable of wireless or wired communications.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
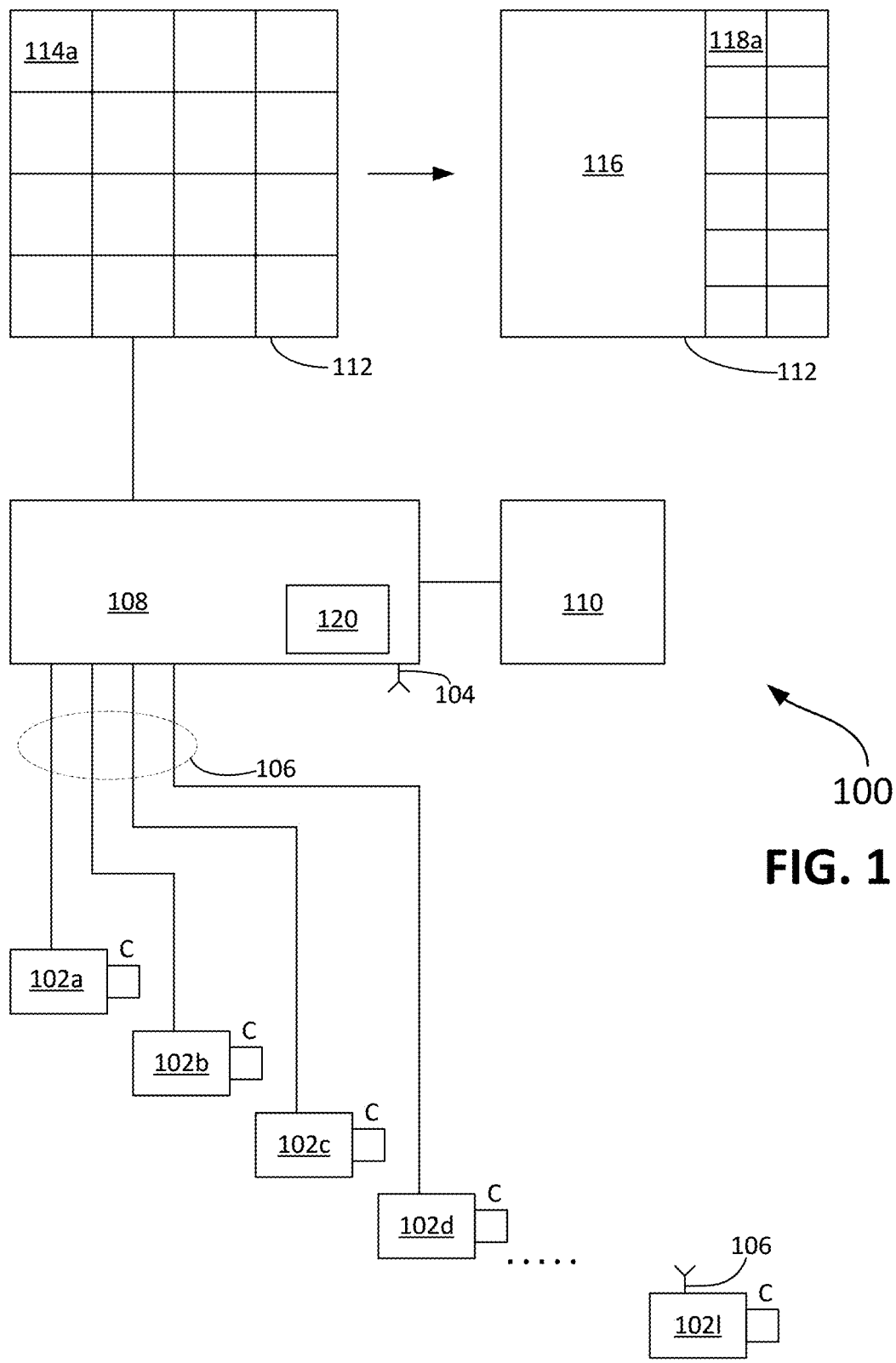
FIG. 1 illustrates a block diagram of a currently available multiple input-multiple output (MIMO) video display system (MIMO-VDS), configured in the form factor of a surveillance system that comprises twelve different cameras, each of which provides a live video feed to a central processing station.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as control systems that can be used as surveillance systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Conventional Multiple Input-Multiple Output Video Display System (MIMO-VDS)
102 Camera (High-definition/4K)
104 Wireless (WL) Transceiver Link (including antenna)
106 Physical Link (wired)
108 Central Processing Station (CPS)
110 VDS Interface
112 Video Display
114 First Video Display Area
116 Second Video Display Area
118 Third Video Display Area
120 VDS Processor, Memory, and Program/Application and Other Internal Circuitry (VDS Circuitry)
200 Internet Protocol (IP) Based Surveillance System (IP-BSS)
202 WiFi Transceiver
203 Physical Internet Protocol (IP) Based Video Link (Physical IP Link)
204 Network (NW) Switch
205 Wireless Internet Protocol Based Video Link (WL IP Link)
206 Client Viewing Device (Device)
208 Network Switch Video Surveillance System Application (NW Switch App.)
210 Physical/Wireless Device IP Based Link (Device Link)
212 User Device Video Surveillance System Application (Device App.)
300 Method for Using Both Video and Periodically Refreshed Images in an IP Based Surveillance System
302-314 Method Steps of Method 300
400 Electronic Processing/Communications Device (EPD)
402 Central Processor Unit (CPU)
404 Nonvolatile Storage
406 Main Memory
408 Network Interfaces
410 Wired Input/Output (I/O) Interface
412 Personal Area Network (PAN) Interface
414 Local Area Network (LAN) Interface
416 Wide Area Network (WAN) Interface
418 Programmable Relay Ports
420 Internal Bus
500 Network (NW) System
506 Internet Service Provider (ISP)
508 Modulator/Demodulator (MODEM)
510 Wireless Router
512 Plain Old Telephone Service (POTS) Provider
514 Cellular Service Provider
518 Communications Satellite
520 Cellular Tower
522 Internet
524 Global Positioning System (GPS) Control Station
526 Satellite Communication Systems Control Station
528 Global Positioning System (GPS) Satellite

LIST OF ACRONYMS USED IN THE SPECIFICATION IN ALPHABETICAL ORDER

The following is a list of the acronyms used in the specification in alphabetical order.
3G Third Generation
4G Fourth Generation
App Application
ASIC Application Specific Integrated Circuitry
AV Audio Video
BIOS Basic Input/Output System
BT Bluetooth
CD Compact Disk
CPS Central Processing Station
CPU Central Processing Unit
DHCP Dynamic Host Communication Protocol
DIN Deutsches Institut für Normung
DNS Dynamic Name System
DVD Digital Video/Versatile Disk
EDGE Enhanced Data Rates for Global System for Mobile Communications Evolution
EGPRS Enhanced General Packet Radio Service
EEPROM Electrically Erasable Programmable Read Only Memory
EPD Electronic Processing/Communications Device
FPGA Field Programmable Gate Array Structures
GAN Global Area Network
GPS Global Positioning System
GSM Global System for Mobile Communications
HD High Definition
HDD Hard Disk Drive
IMT-SC International Mobile Telecommunications-Single Carrier
I/O Input-Output
IP Internet-Protocol
IP-BSS Internet-Protocol Based Surveillance System
IR Infrared
IrDA Infrared Data Association
ISP Internet Service Provider
LAN Local Area Network
MIMO Multiple Input-Multiple Output
MODEM Modulator-Demodulator
NFC Near Field Communication
NIC Network Interface Controller
NW Network
PAN Personal Area Network
PC Personal Computer
PDA Personal Digital Assistant
POTS Plain Old Telephone Service
RAM Random Access Memory
RISC Reduced Instruction Set Processors
ROM Read-only Memory
USB Universal Serial Bus
VDC Voltage, Direct Current
VDS Video Display System
WAN Wide Area Network
WL Wireless The different aspects of the embodiments described herein pertain to the context of systems, methods, and modes for displaying periodically refreshed images in a general purpose control system in place of video until such video is ready to be displayed, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale, integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as IP Based Surveillance System (IP-BSS) 200 can be manufactured by Crestron Electronics Inc., located in Rockleigh, N.J.

Figure 2:
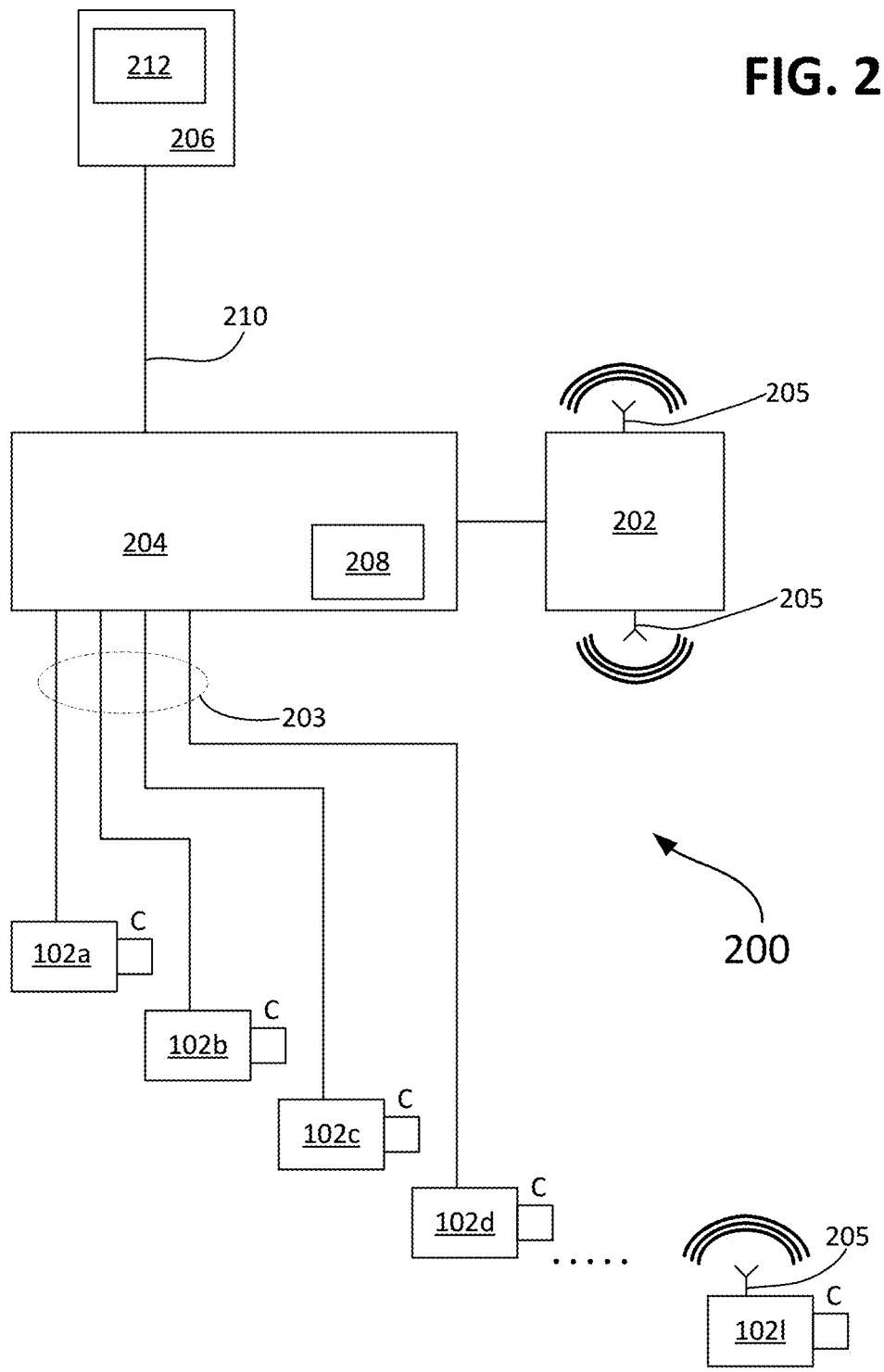
FIG. 2 illustrates a block diagram of an internet-protocol (IP) based surveillance system (IP-BSS) that uses both video and periodically refreshed images according to aspects of the embodiments.
Figure 3:
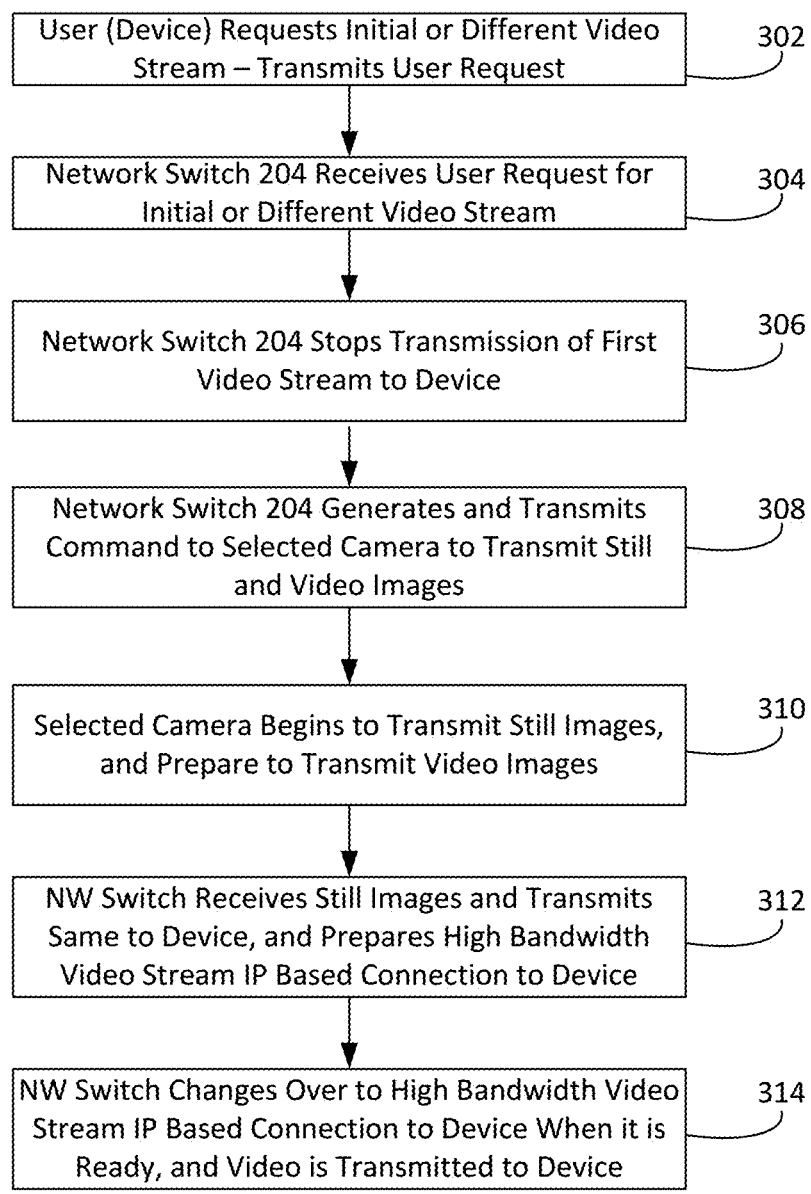
FIG. 3 illustrates a flowchart of a method for using both video and still images in an IP based surveillance system according to aspects of the embodiments.

Attention is now directed towards FIG. 2, which illustrates a block diagram of IP-BSS 200 that uses both video and periodically refreshed images according to aspects of the embodiments, and to FIG. 3, which illustrates a flowchart of method 300 for using both video and periodically refreshed images in an IP based surveillance system according to further aspects of the embodiments.

IP-BSS 200 comprises one or more cameras 102, WiFi transceiver (WiFi) 202, physical IP links 203, network (NW) switch 204, WL internet protocol based video link (WL IP link) 205, at least one client video viewing device (device) 206, NW switch video surveillance system application (NW switch App) 208, physical/wireless device IP based link (device link) 210, and user device video surveillance system application (device App) 212, according to aspects of the embodiments. In fulfillment of the dual purposes of clarity and brevity, a detailed discussion of known components, such as WiFi transceiver 202, which operates in a conventional manner, and the like, shall be omitted from discussion herein. In addition, as with VDS circuitry 120, described above, NW switch 204 comprises standard internal circuitry and operates in a conventional manner but for the manner in which it handles video and periodically refreshed images according to aspects of the embodiments, as will be described in detail herein.

In MIMO-VDS 100, there is practically no lag time between when an operator selects a video feed to when it is displayed on video display 112, whether in first video display area 114, or second video display area 116. This is due, at least in part, to the dedicated nature of MIMO-VDS 100 and the fact that the system is focused on processing high speed digital video feeds, and little else. However, IP-BSS 200 according to aspects of the embodiments, has neither the same dedicated processing power, nor a sole function; that is, in addition to monitoring video feeds, IP-BSS 200 also performs a host of additional control and command functions, and includes many useful features. Nonetheless, many users still desire the surveillance functionality that can be incorporated in a "whole-enterprise" management system such as IB-PSS 200 can be part of. Thus, a means to afford additional improved functionality is needed.

Therefore, aspects of the embodiments as embodied within IB-PSS 200 aim to improve the user surveillance experience by taking advantage of both video and periodically refreshed images that can be provided by cameras 102 in a substantially simultaneous manner. According to aspects of the embodiments, NW switch App 208, which can be stored in one or more of several types of memory within NW switch 204 (the physical aspects of which are described in greater detail below), accepts dual stream locations for the one or more video surveillance devices (e.g., cameras 102).

According to aspects of the embodiments, when an initial stream is requested by the user (by pressing a button on interactive device App 212 stored in memory of device 206), or a switch from a first video stream to a second video stream is requested (by a similar action; method step 302), device 206 generates a command that is transmitted to NW switch 204 (method step 304), via device link 210 (which can be wired or wireless, and performed locally or remotely, through one or more of a cellular NW, LAN, WAN, GAN, among other network types). NW switch App 208 in NW switch 204 receives the command, and performs at least two operations: the first is to stop the transmission of the former video signal from NW switch 204 to device 206 (method step 306), and the second is to generate and transmit one or more signals to the selected camera 102x (method step 308).

Selected camera 102x then substantially instantaneously generates a lower resolution stream of periodically refreshed images (method step 310); according to aspects of the embodiments, the periodically refreshed images can be generated either by a still camera function or extracted from a video stream generated by selected camera 102x; as those of skill in the art can appreciate, in general cameras 102 are substantially continuously generating video images even though they have not been selected. Their outputs are just not used, but can be accessed substantially immediately.

Prior to addressing the remainder of the process for actual transmission of the periodically refreshed images and then the new video stream, it is useful to address the manner in which video and image data is generally transmitted using systems such as IP-BSS 200. As those of skill in the art can appreciate, when setting up IP-BSS 200 it is typically not the case that there will be two physical links between any one camera 102 and NW switch 204, though that can be the case. The typical scenario is one in which there is only one physical path between camera 102 and NW switch 204, and that path is either a wired path 203 or a wireless path 205. Therefore, both the periodically refreshed images and new video stream can use the same path (namely a wired Ethernet or wireless connection 203, 205 to NW switch 204). According to aspects of the embodiments, an advantage of using both periodically refreshed images and a new video stream is to reduce the amount of time a user does not see anything, or views frozen video images.

As those of skill in the art can appreciate, setting up a video stream using an IP based communication path generally requires more handshaking (setting up a session or locking onto an I-Frame) to synchronize the stream between the receiver and the sender, than when sending still images. The video setup handshaking can take anywhere from a few hundred milliseconds to a second or longer, depending on different variables such as processing speed in both the transmitter and receiver, transmitter i-frame intervals, available bandwidth and even the respective processor load(s). According to aspects of the embodiments, using a still image substantially circumvents the video handshaking time delay up front and allows for a substantially immediate retrieval of the still image to display on device 206.

As those of skill in the art can further appreciate, still images are generally of lower resolution and require less transfer of data to get to a receiver, in this case, NW switch 204. Therefore, still images, and in particular periodically refreshed images, can get transferred substantially faster than a video stream. As those of skill in the art can appreciate, a video stream is typically transmitted at about 24-30 frames per second, where as a periodically refreshed image can be transmitted at about 2-3 frames per second, which, according to aspects of the embodiments, still provides the appearance of a "live video stream," albeit not as smoothly as an actual video stream.

As those of skill in the art can still further appreciate, typical video streams from cameras 102 can be transmitted via an IP based wired or wireless path with a bandwidth ranging from about several hundred kilo-bits-per second (Kbps) (about 700 Kbps) to a few mega-bits-per second (Mbps) (abut 2-10 Mbps). According to aspects of the embodiments, IP BSS 200 implements a video stream in an IP based path using a bandwidth of 2.5 Mpbs.

That is, when the command that has been generated by NW switch App 208 in NW switch 204 is received at selected camera 102x, selected camera 102x substantially immediately generates and transmits a plurality of periodically refreshed images produced either as a series of still image captures, or a series of single frame extractions from the video stream prior to processing and transmission (such processing can include, among other functions, one or more of each of data compression and encryption algorithms).

According to further aspects of the embodiments, a plurality of periodically refreshed images can be generated and transmitted substantially periodically to give the user of device 206 the appearance of a near real-time view of selected camera 102x using a first IP based communication path; this gives NW switch 204 time to set up a second IP based communication path between selected camera 102x, itself, and device 206. Displaying the plurality of periodically refreshed images provides the appearance of a video image. As those of skill in the art can appreciate, either or both of physical IP link 203 and WL IP link 205 can be of sufficient bandwidth to support a plurality of high bandwidth communication paths. As those of skill in the art can further appreciate, physical IP link 203 can be a fiber optic cable, or category 5 Ethernet cable, or some other similar type/bandwidth cable. WL IP link 205 can also support multiple IP based video-capable bandwidth communication paths. According to still further aspects of the embodiments, either or both of the first and second IP based communications paths can utilize BlueTooth communications technology, a WiFi communications path, a cellular telephone communications path, or a near field communications (NFC) path While the lower bandwidth, and low set-up time periodically refreshed images are being transmitted from selected camera 102x over the low bandwidth IP based communication path, received by NW switch 204 (method step 312), and then transmitted to device 206 (method step 312), NW switch 204 is creating a relatively higher bandwidth, higher definition video stream (new video stream), which is simultaneously connected and set up in the background (method step 312).

NW switch 204 monitors the development of the new video stream, and once it is available and ready to display, it is seamlessly transitioned onto the screen of device 206 (method step 314). The result is the user never sees any substantial interruption in video provided by the previous camera 102 and newly selected camera 102x, such that switching between sources appears substantially instantaneous and smooth.

According to aspects of the embodiments, such substantially seamless transitioning between video images generated by two different cameras 102x-1 and 102x would otherwise be impossible to achieve without using hard-wired cameras and/or much more expensive, sophisticated hardware in camera 102, as well in the other hardware devices.

Figure 4:
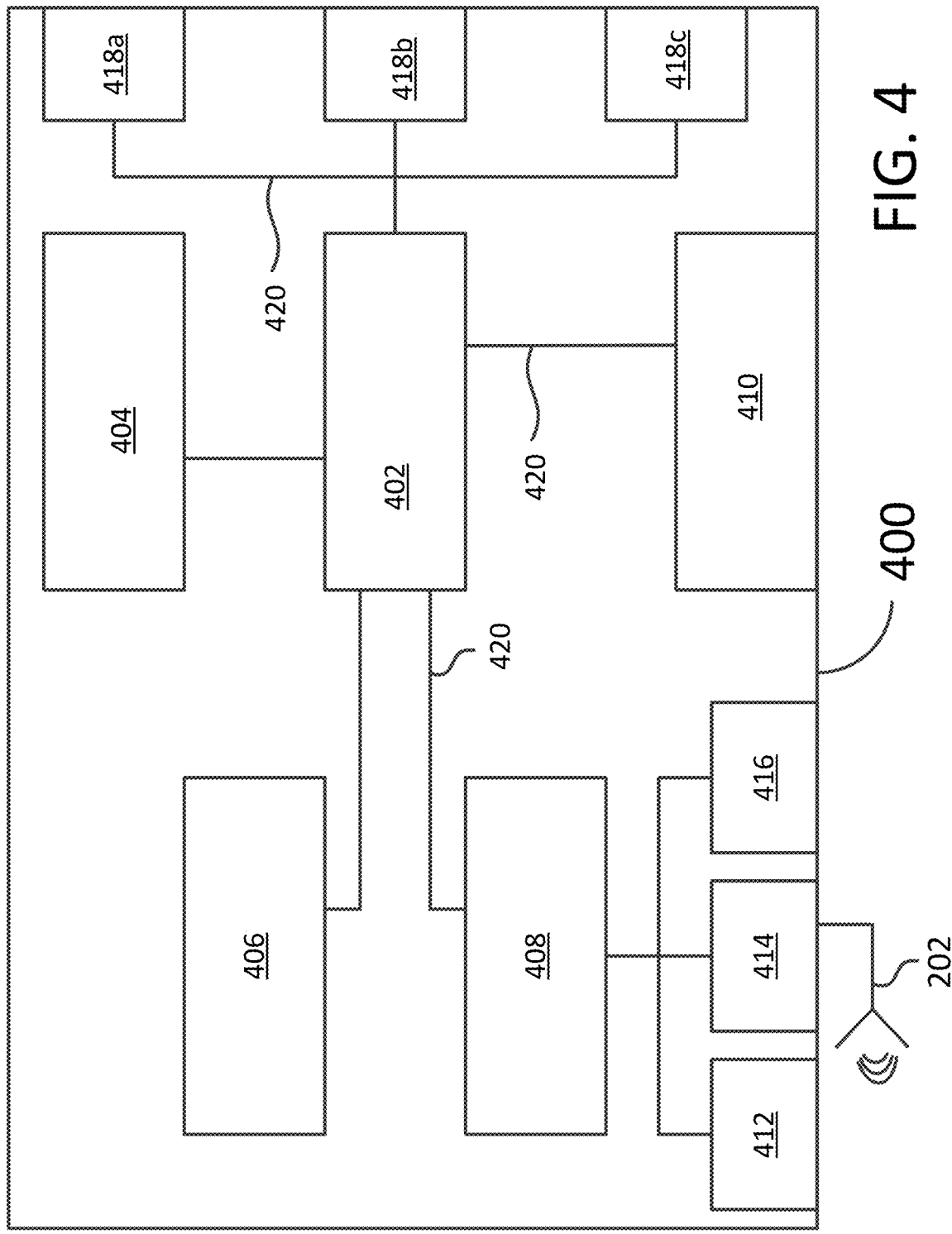
FIG. 4 is a block diagram of the major components of both of a network switch and a client viewing device, which can be collectively referred to as an electronic processing/communications device suitable for use to implement a method for using both video and periodically refreshed images in an IP based surveillance system according to an aspect of the embodiments.

FIG. 4 is a block diagram of the major components of both of NW switch 204 and device 206, which can be collectively referred to as electronic processing/communications device (EPD) 400 suitable for use to implement method 300 for using both video and periodically refreshed images in an IP based surveillance system according to an aspect of the embodiments. As those of skill in the art can appreciate, both of NW switch 204 and device 206 will not only have a core set of common components with respective functionality, but also individual components and functionalities particular to their respective uses in IP-BSS 200. According to aspects of the embodiments, the functionality of method 300 in NW switch App 208 and device App 212 can be implanted in EPD 400, which can also embody the functionality of device 206 and NW switch 204; however, in fulfillment of the dual purposes of clarity and brevity, the discussion of FIG. 4 pertains to those core set of common components and respective functionalities, and thus has been represented, for purposes of this discussion, as EPD 400 according to aspects of the embodiments.

EPD 400 can include at least one central processing unit (CPU) 402, as well as internal bus 420, the operation of which is known to those of skill in the art. Aspects of the embodiments of CPU 402 are described in greater detail below. For example, CPU 402 can represent one or more microprocessors, and the microprocessors may be "general purpose" microprocessors, a combination of general and special purpose microprocessors, or application specific integrated circuits (ASICs). Additionally or alternatively, CPU 402 can include one or more reduced instruction set processors (RISC), video processors, or related chip sets. CPU 402 can provide processing capability to execute and run various applications, and/or provide processing for one or more of the techniques described herein. Applications that can run on EPD 400 can include, for example, software for processing control commands, software for managing a calendar, software for controlling other electronic devices via a control network as noted above, among other types of software/applications.

EPD 400 can further include main memory 406, which can be communicably coupled to CPU 402, and which can store data and executable code, as known to those of skill in the art. Main memory 406 can represent volatile memory such as random access memory (RAM), but can also include nonvolatile memory, such as read-only memory (ROM) or Flash memory. In buffering or caching data related to operations of CPU 402, main memory 406 can store data associated with applications running on EPD 400.

EPD 400 can also further include nonvolatile storage 404. Nonvolatile storage 404 can represent any suitable, nonvolatile storage medium, such as a hard disk drive (HDD) or nonvolatile memory, such as flash memory. Being well-suited to long-term storage, nonvolatile storage 404 can store data files such as media, software, and preference information. Nonvolatile storage 404 can be removable and interchangeable, thereby allowing portability of stored files, such as project files, among other types, as created during programming of IP-BSS 200. According to aspects of the embodiments, project files can be used to map user desires into functions; as used thusly, project files are configuration files. These project files describe all the devices IP-BSS 200 has knowledge of, what types of devices they are, how they operate, and the operating parameters, among other features of each controllable device associated with IP-BSS 200.

Also shown as part of EPD 400 is network interface 408. Network interface 408 provides interface capability with one or more of several different types of network interfaces, including PAN interface 412, LAN interface 414, and WAN interface 416. Each of the network interfaces 412, 414, and 416 can provide connectivity for EPD 400. Network interface 408 can represent, for example, one or more network interface controllers (NICs) or a network controller. As those of skill in the art can appreciate, the difference between a LAN and PAN can be less certain, and more one of degree; that is, in some cases, PANs are defined as those interconnections of devices that are within a few meters of each other, while other definitions indicated that devices that are within ten meters or so and are interconnected can be considered to be within a PAN. Regardless of the exact definition, or, if no exact definition should ever exist, IP-BSS 200 can make use of each of a WAN, LAN, and PAN, or sometimes two or all three at one time, depending on the circumstances, as those of skill in the art can now appreciate.

According to certain aspects of the embodiments, network interface 408 can include PAN interface 412. PAN interface 412 can provide capabilities to network with, for example, a Bluetooth® network, or a near field communication (NFC)

type network. As can be appreciated by those of skill in the art, the networks accessed by PAN interface 412 can, but do not necessarily, represent low power, low bandwidth, or close range wireless connections. PAN interface 412 can permit one electronic device to connect to another local electronic device via an ad-hoc or peer-to-peer connection. However, the connection can be disrupted if the separation between the two electronic devices exceeds the proscribed range capability of PAN interface 412.

Network interface 408 can also include LAN interface 414. LAN interface 414 can represent an interface to a wired Ethernet-based network, but can also represent an interface to a wireless LAN, such as an 802.11x wireless network. The range of LAN interface 414 can generally exceed the range available via PAN interface 412. Additionally, in many cases, a connection between two electronic devices via LAN interface 414 can involve communication through a network router or other intermediary device, such as WiFi transceiver 202 (shown in FIG. 2). LAN interfaces can also incorporate IEEE 802.15.4 (e.g. Zigbee) network, or an ultra-wideband network. As those of skill in the art can appreciate, the networks described by IEEE 802.15.4 are mesh-type networks, and operate with a central router/coordinator; in IP-BSS 200, the function of such central coordination is performed by EPD 400, according to aspects of the embodiments.

As known by those of skill in the art, Ethernet connectivity enables integration with IP-controllable devices and allows EPD 400 to be part of a larger managed control network. Whether residing on a sensitive corporate LAN, a home network, or accessing the Internet through a cable modem, EPD 400 can provide secure, reliable interconnectivity with IP-enabled devices, such as touch screens, computers, mobile devices, video displays, Blu-ray Disc® players, media servers, security systems, lighting, HVAC, and other equipment—both locally and globally.

EPD 400 can also include one or more wired I/O interface 410 for a wired connection between EPD 400 and one or more electronic devices. Wired I/O interface 410 can represent a serial port. A serial port, as those of skill in the art can appreciate, is a serial communication physical interface through which information transfers in or out one bit at a time (as opposed to a parallel port). While it is known that interfaces such as Ethernet, FireWire, and universal serial bus (USB), all send data as a serial stream, the term "serial port" usually identifies hardware more or less compliant to the RS-232 standard, intended to interface with a modem or with a similar communication device.

Wired I/O interface 410 can also represent, for example, a Cresnet port. Cresnet provides a network wiring solution for Crestron keypads, lighting controls, thermostats, and other devices that don't require the higher speed of Ethernet. The Cresnet bus offers wiring and configuration, carrying bidirectional communication and 24 volts, direct current (VDC) power to each device over a simple 4-conductor cable.

One or more infrared (IR) interfaces can also be part of wired I/O interface 410; the IR interface can enable EPD 400 to receive and/or transmit signals with infrared light. The IR interface can comply with the Infrared Data Association (IrDA) specification for data transmission. Alternatively, the IR interface can function exclusively to receive control signals or to output control signals. The IR interface can provide a direct connection with one or more devices such as a centralized audio/video (AV) sources, video displays, and other devices.

EPD 400 can also include, but not necessarily, one or more programmable relay ports 418a-c. Programmable relay ports 418 can be used by EPD 400 to control window shades, projection screens, lifts, power controllers, and other contact-closure actuated equipment. EPD 400 can include, as programmable relay port 418, a "Versiport" relay port that is manufactured by Crestron Electronics Inc., of Rockleigh, N.J. The Versiport relay port can be managed by a DIN type module (Deutsches Institut für Normung), more specifically a DIN-IO8 module (also manufactured by Crestron Electronics Inc.), which is a DIN rail-mounted automation control module that provides eight Versiport I/O ports for interfacing with a wide range of third-party devices and systems. Each "Versiport" can be configured via software to function as a digital or analog sensing input, or as a digital trigger output. When configured as a digital input, the Versiport can sense a contact closure or logic level signal from devices such as motion detectors, partition sensors, alarm panels, 12 VDC triggers, and all types of switches and relays. When configured as an analog input, the Versiport can sense changes in a resistance or DC voltage level, working with everything from temperature and light sensors to water level meters to volume control potentiometers. When operating as a digital output, the Versiport provides a logic level closure signal to trigger control and alarm inputs on a variety of external devices.

Thus, one or more "Versiport" programmable relay ports 418 can enable the integration of occupancy sensors, power sensors, door switches, or other devices by providing a dry contact closure, low-voltage logic, or 0-10 VDC signal.

According to further aspects of the embodiments in regard to EPD 400, network interfaces 408 can include the capability to connect directly to a WAN via a WAN interface 416. WAN interface 416 can permit connection to a cellular data network, such as the enhanced data rates for global system for mobile communications (GSM) Evolution (EDGE) (also known as enhanced general packet radio service (EGPRS), or international mobile telecommunications (IMT) single carrier (IMT-SC) EDGE network, or other third generation/fourth generation (3G/4G) cellular telecommunication networks (a detailed discussion of which is both not needed to understand the aspects of the embodiments, and beyond the scope of this discussion). When connected via WAN interface 216, EPD 400 can remain connected to the internet and, in some embodiments, to one or more other electronic devices, despite changes in location that might otherwise disrupt connectivity via PAN interface 412 or LAN interface 414.

By leveraging remote access of EPD 400, a user can control one or more of the controllable devices and/or environment settings in a facility (home, place of business or manufacture, or enterprise location) from substantially anywhere in the world using device 206. Such control can be accomplished by a dynamic domain name system (DNS) service. Those of skill in the art can appreciate that DNS is a hierarchical distributed naming system used for computers, services, or any resource that is connected to the internet or a private network. According to further aspects of the embodiments, EPD 400 can be configured to utilize dynamic host communication protocol (DHCP) communications that include a hostname prefixed by a model number.

As also will be appreciated by one skilled in the art, the various functional aspects of the embodiments can be embodied in a wireless communication device, a telecommunication network, or as a method or in a computer program product. Accordingly, the embodiments can take the form of an entirely hardware embodiment or an embodiment combining hardware and software aspects. Further, the embodiments can take the form of a computer program product stored on a computer-readable storage medium having computer-readable instructions embodied in the medium. Any suitable computer-readable medium can be utilized, including hard disks, compact disk (CD) ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), ASICs, microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, electrically erasable programmable read only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media.

For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a system and method for using both video and periodically refreshed images in an IP based surveillance system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Figure 5:
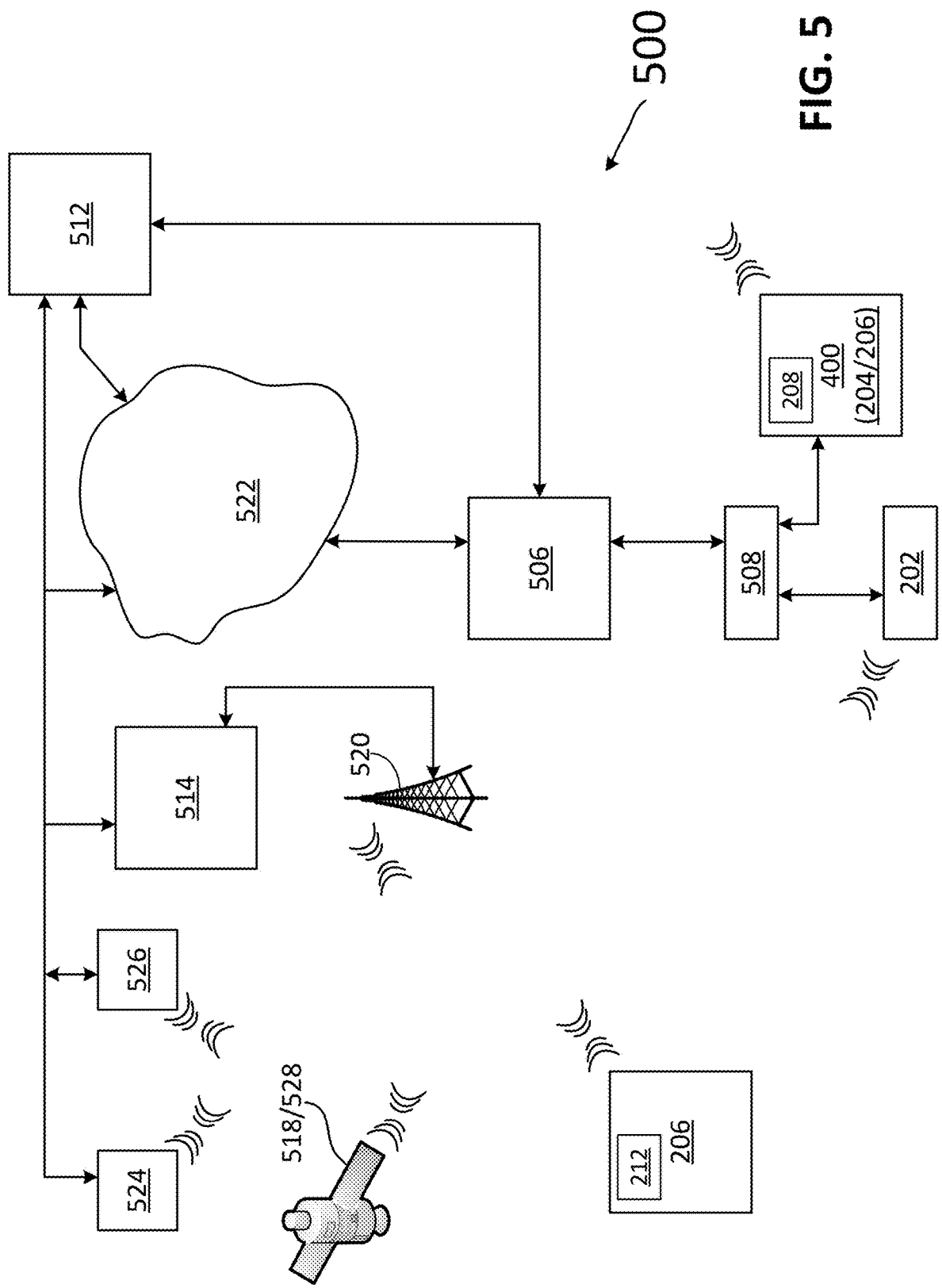
FIG. 5 illustrates a network within which the system and method for using both video and periodically refreshed images in an IP based surveillance system can be used according to aspects of the embodiments.

FIG. 5 illustrates network (NW) system 500 within which IP-BSS 200 and method 300 for using both video and periodically refreshed images in an IP based surveillance system can be used/operated according to an aspect of the embodiments. Much of the network system infrastructure shown in FIG. 5 is or should be known to those of skill in the art, so, in fulfillment of the dual purposes of clarity and brevity, a detailed discussion thereof shall be omitted.

According to aspects of the embodiments, a user of IP-BSS 200 and method 300 for using both video and periodically refreshed images in an IP based surveillance system would have device App 212 on their device 206 and NW switch App 208 located in EPD 400 (or NW switch 204); device 206 can include, but are not limited to, so-called smart phones, tablets, personal digital assistants, notebook and laptop computers, as well as a plurality of any other stationary or mobile electronic devices that can access the internet and/or cellular phone service or can facilitate transfer of the same type of data in either a wired or wireless manner. For purposes of this discussion, the user shall be discussed as using only device 206 as if it were cellular based device, i.e., a smartphone, though such discussion should be understand to be in a non-limiting manner in view of the discussion above about the other types of devices that can access, use, and provide such information.

In FIG. 5, the user has device 206, which can access cellular service provider 514, either through a wireless connection (cellular tower 520) or via a wireless/wired interconnection (a "Wi-Fi" system that comprises, e.g., modulator/demodulator (modem) 508, WiFi transceiver 202, EPD 400, internet service provider (ISP) 506, and internet 522). Further, device 206 can include NFC, "Wi-Fi," and Bluetooth (BT) communications capabilities as well, all of which are known to those of skill in the art. To that end, NW system 500 further includes, as many homes (and businesses) do, one or more EPDs 400 that can be connected to WiFi transceiver 202 via a wired connection (e.g., through modem 508) or via a wireless connection (e.g., BT). Modem 508 can be connected to ISP 506 to provide internet based communications in the appropriate format to end users (e.g., EPD 400), and which takes signals from the end users and forwards them to ISP 506. Such communication pathways are well known and understand by those of skill in the art, and a further detailed discussion thereof is therefore unnecessary.

Device 206 can also access global positioning system (GPS) satellite 528, which is controlled by GPS station 524, to obtain positioning information (which can be useful for different aspects of the embodiments), or device 206 can obtain positioning information via cellular service provider 514 using cell tower(s) 520 according to one or more well-known methods of position determination. Some devices 206 can also access communication satellites 518 and their respective satellite communication systems control station 526 (the satellite in FIG. 5 is shown common to both communications and GPS functions) for near-universal communications capabilities, albeit at a much higher cost than conventional "terrestrial" cellular services. Device 206 can also obtain positioning information when near or internal to a building (or arena/stadium) through the use of one or more of NFC/BT devices, the details of which are known to those of skill in the art. FIG. 5 also illustrates other components of NW system 500 such as POTS provider 512.

According to further aspects of the embodiments, NW system 500 also contains EPD 400, wherein one or more processors, using known and understood technology, such as memory, data and instruction buses, and other electronic devices, can store and implement code that can implement the system and method for using both video and periodically refreshed images in an IP based surveillance system according to an embodiment.

As described above, an encoding process is discussed in reference to FIG. 3 and method 300. The encoding process is not meant to limit the aspects of the embodiments, or to suggest that the aspects of the embodiments should be implemented following the encoding process. The purpose of the encoding process is to facilitate the understanding of one or more aspects of the embodiments and to provide the reader with one or many possible implementations of the processed discussed herein. FIG. 3 illustrates a flowchart of various steps performed during the encoding process. The steps of FIG. 3 are not intended to completely describe the encoding process but only to illustrate some of the aspects discussed above.

The disclosed embodiments provide a system, software, and a method for using both video and periodically refreshed images in an IP based surveillance system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for displaying periodically refreshed images in a general purpose control system in place of video until such video is ready to be displayed.

ALTERNATE EMBODIMENTS

Alternate embodiments can be devised without departing from the spirit or the scope of the different aspects of the embodiments.

What is claimed is:

1. A method for using both video and periodically refreshed images in a video surveillance system, comprising:
    receiving a first request from a first device at a first camera for a first video stream generated by the first camera to be transmitted using a first communication path;
    beginning the process of establishing the first communications path from the first camera to the first device;
    establishing a second communications path from the first camera to the first device while the first communications path is being established, wherein the second communications path can be used to transmit a plurality of periodically refreshed images while the first communications path is being established;

transmitting the plurality of periodically refreshed images from the first camera to the first device using the second communications path while the first communications path is being established;

transmitting the first video stream from the first camera to the first device using the first communications path once it has been established, and then shutting down the transmission of the plurality of periodically refreshed images using the second communications path;

receiving the first request from the first device at a network switch, and transmitting the same to the first camera from the network switch;

establishing both the first and second communication paths between the first camera and the first device through the network switch;

shutting down the second communications path by the network switch once the first communications path is established by the network switch;

receiving both of the transmitted plurality of periodically refreshed images and first video stream from the first camera at the network switch, and transmitting both of the same to the first device from the network switch; and transmitting a second request by the network switch to the first camera to generate and transmit a plurality of periodically refreshed images using the second communications path.

2. The method according to claim 1, wherein
both the first and second communications path are the same physical high bandwidth internet protocol based communications path capable of transmitting video signals.

3. The method according to claim 1, wherein
the first and second communications path are different physical internet protocol based communications paths.

4. The method according to claim 1, wherein the video surveillance system is part of an enterprise management system.

5. The method according to claim 1, wherein the first device can be any type of electronic device capable of wireless or wired communications.

6. An enterprise management system including a video surveillance function feature, comprising, among other components:

a first camera adapted to generate both video and periodically refreshed images, and to respond to requests for the same;

a first device adapted to receive and display both video and periodically refreshed images, and to generate a first request to the first camera for a first video stream generated by the first camera to be transmitted using a first communication path;

the enterprise management system adapted to generate commands to establish the first communications path from the first camera to the first device, and to generate commands to establish a second communications path from the first camera to the first device while the first communications path is being established, and wherein the second communications path can be used to transmit a plurality of periodically refreshed images while the first communications path is being established; and a network switch adapted to
receive the first request from the first device, and transmit the same to the first camera,
establish both the first and second communication paths between the first camera and the first device through the network switch,
shut down the second communications path once the first communications path is established, and is further adapted to
receive both of the transmitted plurality of periodically refreshed images and first video stream from the first camera and transmit both of the same to the first device, and is further adapted to
transmit a second request to the first camera to generate and transmit a plurality of periodically refreshed images using the second communications path.

7. The system according to claim 6, further comprising:
a network switch adapted to
generate commands to establish the first and second communications paths, and
generate commands to terminate the second communications path once the first communications path is established and transmitted the first video stream.

8. The system according to claim 6, wherein
both the first and second communications path are the same physical high bandwidth internet protocol based communications path capable of transmitting video signals.

9. The method according to claim 6, wherein
the first and second communications path are different physical internet protocol based communications paths.

10. The system according to claim 6, wherein
the first device can be any type of electronic device capable of wireless or wired communications.

* * * * *